United States Patent
Vogel (10) Patent No.: US 9,925,606 B2
(45) Date of Patent: Mar. 27, 2018

(54) POWER SKIVING METHOD HAVING MULTIPLE CUT STRATEGY

(71) Applicant: Klingelnberg AG, Zürich (CH)

(72) Inventor: Olaf Vogel, Ettlingen (DE)

(73) Assignee: KLINGELNBERG AG (CH)

( * ) Notice: Subject to any disclaimer, the term of this patent is extended or adjusted under 35 U.S.C. 154(b) by 73 days.

(21) Appl. No.: 14/969,434

(22) Filed: Dec. 15, 2015

(65) Prior Publication Data

US 2016/0167145 A1   Jun. 16, 2016

(30) Foreign Application Priority Data

Dec. 16, 2014   (EP) ..................... 14198168

(51) Int. Cl.
*B23F 5/12*   (2006.01)
*B23F 5/16*   (2006.01)
*G05B 19/18*   (2006.01)

(52) U.S. Cl.
CPC ............ *B23F 5/163* (2013.01); *G05B 19/186* (2013.01); *G05B 2219/36198* (2013.01)

(58) Field of Classification Search
CPC .................. B23F 5/163; G05B 19/186; G05B 2219/36198
See application file for complete search history.

(56) References Cited

U.S. PATENT DOCUMENTS

2014/0234043 A1   8/2014   Nakahara et al.

FOREIGN PATENT DOCUMENTS

| DE | 3915976 A1 | 11/1990 | |
|---|---|---|---|
| DE | 102008037514 A1 | 5/2010 | |
| DE | 102014201110 A1 | 8/2014 | |
| EP | 2596893 A1 | 5/2013 | |
| WO | 2012159942 A1 | 11/2012 | |
| WO | WO 2013076030 A1 * | 5/2013 | .............. B23F 21/04 |

OTHER PUBLICATIONS

European Search Report for European Patent Application No. 14198168.8 dated Jun. 2, 2015. 7 pages.

\* cited by examiner

*Primary Examiner* — Alan Snyder
(74) *Attorney, Agent, or Firm* — McCarter & English, LLP (57) ABSTRACT

Method for power skiving a workpiece (50) having a workpiece axis of rotation (R2) and having a rotationally-symmetrical, periodic structure using a power skiving tool (100).

27 Claims, 9 Drawing Sheets

Fig. 1

PRIOR ART

POWER SKIVING METHOD HAVING MULTIPLE CUT STRATEGY

CROSS-REFERENCE TO RELATED APPLICATION

This application claims priority under 35 U.S.C. § 119 (a)-(d) to European application no. EP 14198168.8 filed Dec. 16, 2014, which is hereby expressly incorporated by reference as part of the present disclosure.

FIELD OF THE INVENTION

The subject matter of the invention is a method for power skiving gear teeth.

BACKGROUND OF THE INVENTION

There are numerous methods for manufacturing gearwheels. In the case of cutting soft pre-machining, a differentiation is made between hobbing, gear shaping, generating planing, and power skiving. Hobbing and power skiving are so-called continuous methods.

Figure 1:
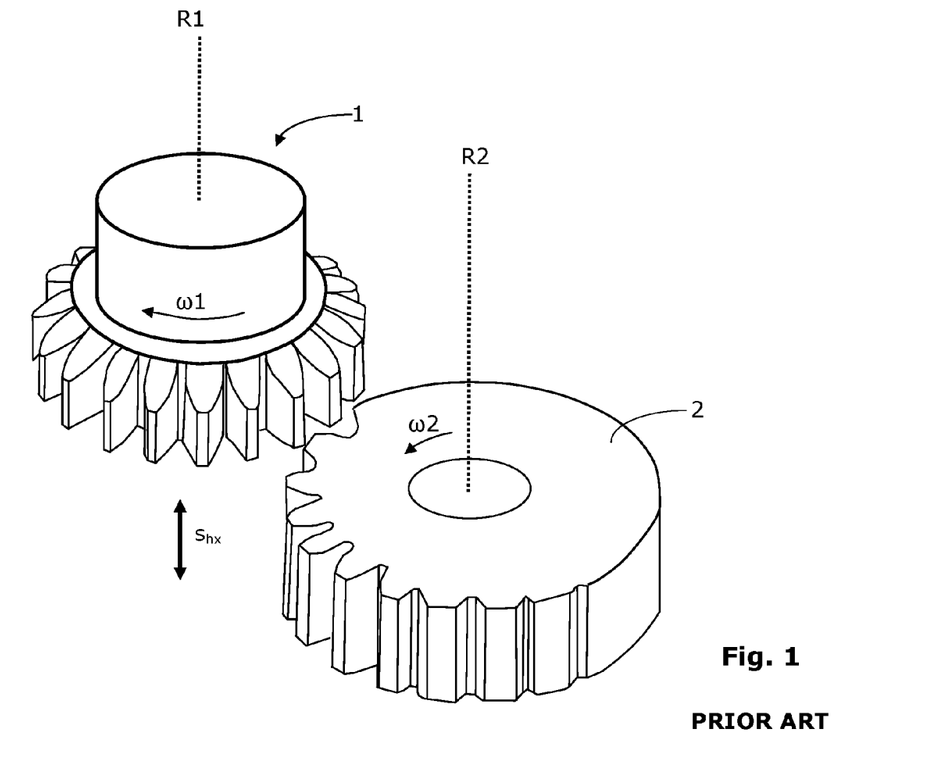
FIG. 1 shows a schematic illustration of a shaping wheel having cylindrical external contour engaged with an externally-toothed workpiece during the gear shaping.

The gear shaping method can be described or illustrated by a cylinder wheel gearing, since the intersection angle (also called the intersection angle of axes) between the axis of rotation R1 of the shaping tool 1 and the axis of rotation R2 of the workpiece 2 is 0°, as schematically shown in FIG. 1. The two axes of rotation R1 and R2 extend in parallel when the intersection angle of axes is 0°. The workpiece 2 and the shaping tool 1 rotate continuously about the axes of rotation R2 or R1, respectively, thereof. These rotational movements are shown by the reference signs $\omega_1$ and $\omega_2$. The shaping tool 1 performs a stroke movement in addition to the rotational movement, which is identified in FIG. 1 by the double arrow $s_{hx}$, and removes chips from the workpiece 2 during this stroke movement.

Some time ago, a method was revived, which is referred to as power skiving. The fundamentals are approximately 100 years old.

Figure 2A:
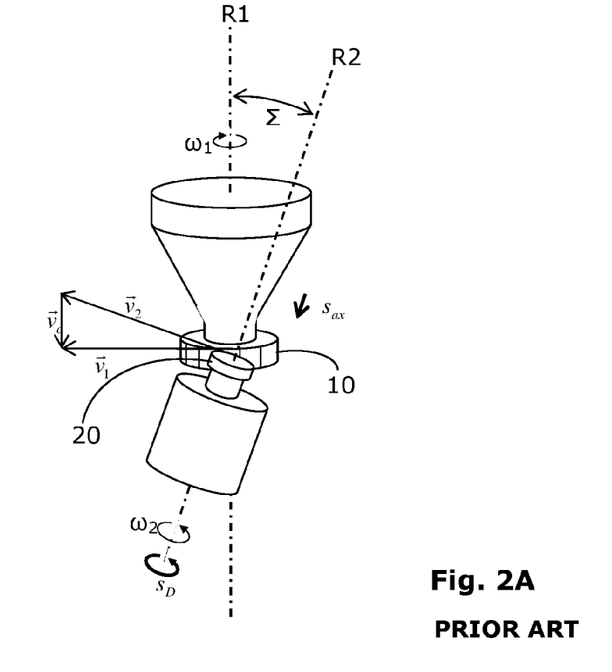
FIG. 2A shows a schematic illustration of a straight-toothed skiving wheel having cylindrical external contour engaged with an externally-toothed workpiece during the power skiving.

In the case of power skiving, as shown in FIG. 2A, an intersection angle of axes Σ between the axis of rotation R1 of the power skiving tool 10 (also referred to as the skiving wheel) and the workpiece axis of rotation R2 of the workpiece 20 is specified, which is not equal to zero. The resulting relative movement between the power skiving tool 10 and the workpiece 20 is a spiral movement, which can be decomposed into a rotary component (rotational component) and a thrust component (translational component). A cylindrical screw gearing can be considered to be a drive technology analog, wherein the rotary component corresponds to the rolling and the thrust component corresponds to the sliding of the flanks. The greater the intersection angle of axes Σ is with respect to absolute value, the more the translational movement component required for the machining of the workpiece 20 increases. Specifically, it causes a movement component of the flank cutters of the power skiving tool 10 in the direction of the tooth flanks of the workpiece 20. In the case of power skiving, the sliding component of the meshing relative movement of the engaged gear wheels of the crossed helical equivalent gearing is utilized to execute the cutting movement. In power skiving, only a slow axial feed $s_{ax}$ (also called axial feed) in parallel to the axis of rotation R2 of the workpiece 20 is required and the so-called impact movement is omitted, which is typical for gear shaping. Therefore, no reverse stroke movement occurs in the case of power skiving.

The cutting speed in power skiving is directly influenced by the rotational speed of the power skiving tool 10 or of the workpiece 20 and on the intersection angle of axes Σ used of the axes of rotation R1 and R2. The intersection angle of axes Σ and therefore the sliding component are to be selected so that an optimum cutting speed is achieved for the machining of the material at given rotational speed.

The movement sequences and further details of a power skiving method can be inferred from the already-mentioned schematic illustration in FIG. 2A. FIG. 2A shows the power skiving of external gear teeth on a cylindrical workpiece 20. The workpiece 20 and the tool 10 (a cylindrical power skiving tool 10 here) rotate in opposite directions, as can be seen in FIG. 2A, for example, on the basis of the angular velocities $\omega_1$ and $\omega_2$. The cylindrical tool 10 is inclined away from the workpiece 20 to generate kinematic clearance angles.

Further relative movements are added thereto. The above-mentioned axial feed s is necessary to be able to machine the entire gear tooth width of the workpiece 20 using the tool 10. The axial feed causes a displacement of the tool 10 in relation to the workpiece 20 in the parallel direction to the workpiece axis of rotation R2. The direction of this movement of the tool 10 is identified in FIG. 2A with $s_{ax}$. If spiral gear teeth are desired on the workpiece 20 (i.e., angle of inclination $\beta_2 \neq 0$), a differential feed $s_D$ is superimposed on the axial feed $s_{ax}$, which, as shown in FIG. 2A, corresponds to an additional rotation of the workpiece 20 about the workpiece axis of rotation R2. The differential feed $s_D$ and the axial feed $s_{ax}$ are adapted at the calculation point AP to one another by computers such that the resulting feed of the tool 10 in relation to the workpiece 20 occurs in the direction of the tooth gap to be generated. In addition, a radial feed $s_{rad}$ can be used, for example, to influence the crowning of the gear teeth of the workpiece 20.

In power skiving, the vector of the cutting speed $\vec{v}_c$ essentially results as the difference of the two velocity vectors $\vec{v}_1$ and $\vec{v}_2$, which are inclined in relation to one another by the effective intersection angle of axes $\Sigma_{eff}$ of the axes of rotation R1, R2 of tool 10 and workpiece 20. $\vec{v}_1$ is the velocity vector on the circumference of the tool 10 and $\vec{v}_2$ is the velocity vector on the circumference of the workpiece 20. The absolute value of the cutting speed $\vec{v}_c$ of the power skiving process can be changed by the intersection angle of axes Σ and the rotational speed in the crossed helical equivalent gearing. Then, as already mentioned, relatively slow axial feed $s_{ax}$ only has a small influence on the cutting speed $\vec{v}_c$ in power skiving, which can be neglected. The axial feed $s_{ax}$ is therefore not considered in the vector diagram having the vectors $\vec{v}_1$, $\vec{v}_2$, and $\vec{v}_c$ in FIG. 2A.

Figure 2B:
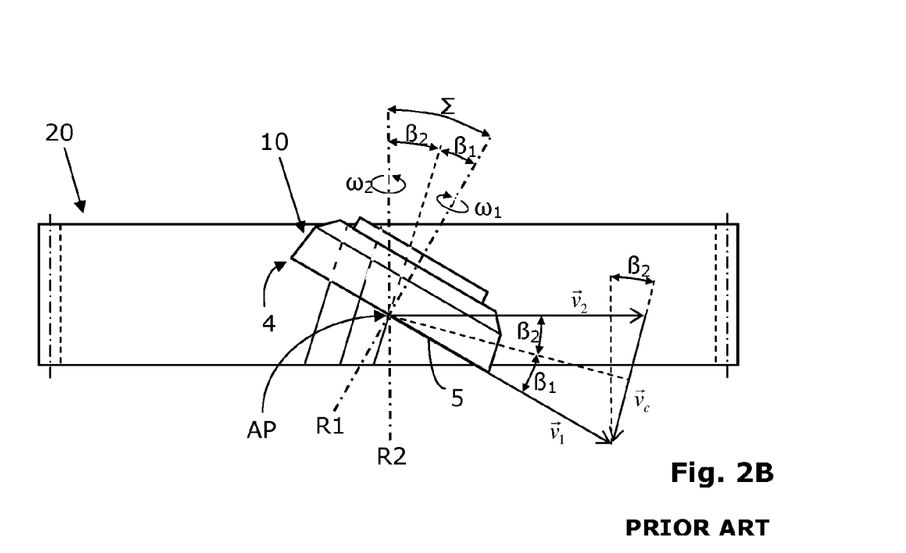
FIG. 2B shows a schematic illustration of a helical-toothed skiving wheel having conical external contour engaged with an externally-toothed workpiece during the power skiving in an axis intersection projection.

FIG. 2B shows the power skiving of external gear teeth of a workpiece 20 using a non-inclined conical power skiving tool 10. In FIG. 2B, the intersection angle of axes Σ, the vector of the cutting speed $\vec{v}_c$, the velocity vectors v, on the circumference of the tool 10 and $\vec{v}_2$ on the circumference of the workpiece 20, and the angle of inclination $\beta_1$ of the tool 10 and the angle of inclination $\beta_2$ of the workpiece 20 are again shown. The angle of inclination $\beta_2$ is not equal to zero here. The tooth head of the tool 10 is identified in FIG. 2B with the reference sign 4. The tooth face is identified in FIG. 2B with the reference sign 5. The two axes of rotation R1 and R2 do not intersect, but rather are arranged skewed in relation to one another. In the case of a conical power skiving tool 10, the calculation point AP is typically selected on the shared perpendicular line of the two axes of rotation R1 and R2, since tilting of the power skiving tool 10 is not required to provide clearance angles. The pitch circles of the spiral rolling equivalent gearing touch in the calculation point AP.

A tool 10, which comprises at least one geometrically defined flank cutting edge, is used in power skiving. The flank cutting edge/flank cutting edges are not shown in FIG. 2A and FIG. 2B. The shape and arrangement of the flank cutting edges are among the aspects which have to be taken into consideration in practice in a specific design.

In the example shown in FIG. 2A, the power skiving tool 10 has the form of a straight-toothed spur gear. The external contour of the main body in FIG. 2A is cylindrical. However, it can also be conical, as shown in FIG. 2B.

In power skiving, the (tooth) gaps are typically generated in multiple cuts with respect to the tooth depth. This is therefore also referred to as a multiple cut strategy. The computer design of the power skiving tool is essentially performed in this case in view of optimum chip conditions for the final cut, during which the final flank surface is generated.

The individual cuts in different tooth depths are typically executed by a corresponding infeed of the power skiving tool in the tooth depth direction. In power skiving using a non-inclined power skiving tool, the infeed corresponds solely to a change of the axial distance between the axes R1 and R2.

Several studies of power skiving using multiple cut strategy have shown that different chip or cutting conditions result for the individual cuts (at the different infeed depths). However, this is the case in particular if the same power skiving tool is used for the individual cuts in power skiving using multiple cut strategy. The chip or cutting conditions are different, since in particular the respective active pitch circle on the workpiece shifts in relation to the design position for the final cut.

The chip or cutting conditions even change significantly in this case, as precise simulations have shown. If inclined power skiving tools are used, in the extreme case, skiving cannot be performed without collision using an optimum power skiving tool for the final cut at a machining depth of approximately 25%.

These differences of the chip forming conditions at the various cutting depths not only result in wear of different levels on the power skiving tool, but rather they can also have an influence on the quality of the generated tooth flanks.

Furthermore, it is characteristic for power skiving that the part of the chip removed from the incoming tooth flank eF is thinner than the part of the chip removed from the outgoing tooth flank aF. This method property of power skiving can also be problematic in the case of a multiple cut strategy.

SUMMARY OF THE INVENTION

Therefore, solutions have been sought, which enable an optimum surface quality of the tooth flanks to be achieved and prevent uneven wear on the power skiving tool.

Above all, this relates to improving the service life of the power skiving tools. Due to reduced wear, the power skiving method becomes more cost-effective, since the production costs in the gear cutting of workpieces are substantially influenced by the tool service lives.

An object of the present invention is therefore to provide a corresponding power skiving method for the power skiving machining of the tooth flanks of a gearwheel or other periodic structures.

This object is achieved by a method disclosed herein, which is referred to here as a power skiving method having multiple cut strategy and tool pivoting. In this case, the freedom in the design of the cutting process, more precisely the chip forming conditions, is the focus of a solution according to certain embodiments of the invention.

That is to say, the object is achieved by a power skiving method, which builds on the principle of the multiple cut strategy, wherein the chip formation on the tool is improved and the service life of the tool is lengthened by way of a step-by-step adjustment of the effective intersection angle of axes.

The power skiving method may be used in conjunction with the production of rotationally-symmetrical, periodic structures, such as gear teeth and the like.

The axis of rotation of the tool is, in the power skiving according to certain embodiments, always set skewed in relation to the axis of rotation of the workpiece, i.e., the intersection angle of axes $\Sigma$ is always not equal to zero.

According to certain embodiments, a correspondingly designed power skiving tool is used, which has been designed and optimized for the final cut. However, to also achieve better cutting conditions in the scope of the multiple cut strategy during the method steps which take place before the final cut, the effective intersection angle of axes is adapted step-by-step.

In a multiple cut strategy, which comprises a first power skiving machining of the workpiece followed by a final second power skiving machining of the workpiece, a different effective intersection angle of axes is specified for the first power skiving machining than for the final second power skiving machining. That is to say, the effective intersection angle of axes is adjusted before carrying out the final second power skiving machining.

If the multiple cut strategy comprises more than only two cuts, more than only two different effective intersection angle of axes can thus also be specified.

An adaptation is ascertained by computer for example, immediately before the execution of the power skiving method according to certain embodiments. Behind this, for non-inclined power skiving tools, is the mathematical relationship between the pitch circle diameters, the intersection angle of axes, and the axial spacing. If the axial spacing is changed and fixed, which is the case in a multiple cut strategy, the pitch circle location can thus be modified by a change of the effective intersection angle of axes.

Certain embodiments relate to a method and a correspondingly adapted/programmed machine for power skiving at least one workpiece having rotationally-symmetrical, periodic structure using the power skiving tool. The following steps may be executed, wherein the sequence of the steps can also be different: providing the workpiece (for example, a blank), providing the power skiving tool, which has multiple cutting teeth, specifying a first effective intersection angle of axes of the power skiving tool in relation to the workpiece, executing a first power skiving machining of the workpiece, wherein during the first power skiving machining, the power skiving tool penetrates up to a first infeed depth into the workpiece and flanks of the periodic structure of the workpiece are pre-machined, specifying a second effective intersection angle of axes of the power skiving tool in relation to the workpiece, executing a second power skiving machining of the workpiece, wherein during the second power skiving machining, the power skiving tool penetrates up to a final infeed depth into the workpiece and the flanks of the periodic structure of the workpiece are further machined, and wherein the first effective intersection angle of axes differs from the second effective intersection angle of axes.

In various embodiments, the term "specify an effective intersection angle of axes" also includes the usage of this effective intersection angle of axes during the execution of the corresponding power skiving machining.

Not all embodiments relate to obtaining exactly the same cutting conditions as in the final cut, but rather above all to improving the cutting conditions of the nonfinal cuts.

The change of the effective intersection angle of axes can also be accompanied by a change of the inclination angle.

According to certain embodiments, a rotational direction reversal does not have to be performed in conjunction with the adjustment of the intersection angle of axes.

It is to be noted here that the rotationally-symmetrical, periodic structures of the workpieces do not necessarily have to have symmetrical teeth, or symmetrical tooth gaps, grooves, or channels. For the sake of simplicity, workpieces having symmetrical teeth are shown and described hereafter. However, certain embodiments may also be applied to asymmetrical structures.

Certain embodiments can be used both for machining external and internal periodic structures and in particular also for machining external and internal gear teeth.

It is characteristic for the power skiving of certain embodiments that the relative movement sequences (called relative movements) between workpiece and tool are specified and executed so that material is progressively removed on the workpiece until the teeth or the other periodic structures are formed (in the case of soft machining from the solid) or finish machined (in the case of hard machining).

Certain embodiments are suitable, inter alia, for the preliminary gear cutting, that is to say, for the machining from the solid. In the preliminary gear cutting according to certain embodiments, the flanks are premachined during the first power skiving machining while maintaining the first intersection angle of axes and all flanks are finish machined during the second power skiving machining after the setting of a second effective intersection angle of axes.

The power skiving according to certain embodiments is a continuous, chip-removing method.

According to certain embodiments, the relative feed movement of the power skiving tool in each processing phase can be overlaid with a radial movement, for example, to influence the crowning of the teeth, according to the technical teaching of German patent application DE3915976 A1.

During the power skiving, the rotating tool completes an axial feed movement in relation to the rotating workpiece in the direction of the workpiece axis of rotation, wherein this axial feed movement extends in the same direction or the opposite direction to the cutting direction.

The tools according to certain embodiments can be designed as so-called solid tools, i.e., they are tools which are embodied as essentially integral. In the solid tools, the cutting teeth are an integral component of the tool.

Cutter head tools (referred to as bar cutter tools here) are particularly advantageous for certain embodiments, which have a disk-like, ring-like, or plate-like cutter head main body, which is equipped with cutter or cutting edge inserts, preferably in the form of bar cutters. Certain embodiments are also possible, which are designed as cutting plate tools, which have a disk-like, ring-like, or plate-like cutter head main body, which is equipped with cutting plates.

The method using certain embodiments can be executed not only using external tools, but rather also using internal tools.

The method using certain embodiments can be carried out both in conjunction with dry machining and also wet machining.

BRIEF DESCRIPTION OF THE DRAWINGS

Further details and advantages of the invention are described hereafter on the basis of exemplary embodiments and with reference to the drawing. In all schematic drawings, for the sake of simplicity of the illustration, workpiece and power skiving tool are reduced to the situation on the pitch circle (or on the workpiece on the pitch cylinder). However, the illustrated relationships also apply for all of the gear teeth having a tooth height.

DETAILED DESCRIPTION OF EMBODIMENTS OF THE INVENTION

Terms are used in conjunction with the present description which are also used in relevant publications and patents. However, it is to be noted that the use of these terms is only to serve for better comprehension. The concept of the invention and the scope of protection of the patent claims are not to be restricted in the interpretation by the specific selection of the terms. The invention may be readily transferred to other term systems and/or technical fields. The terms are to be applied accordingly in other technical fields.

Rotationally-symmetrical, periodic structures are, for example, gearwheels (such as spur gears) having internal or external gear teeth. However, this can also relate, for example, to brake disks, clutch or transmission elements, and the like. In particular, this relates to the production of pinion shafts, worms, elements for gearwheel pumps, ring joint hubs (ring joints are used, for example, in the automotive sector, to transmit the force from a differential to a vehicle wheel), spline shaft connections, sliding collars, pulleys, and the like. The periodic structures are also referred to as periodically repeating structures here.

Reference is primarily made hereafter to gearwheels, teeth, and tooth gaps. However, the invention may also be transferred to other components having other periodic structures, as mentioned above. In these other components, this does not relate to tooth gaps in this case, but rather to grooves or channels, for example.

Since aspects of the invention relate to the intersection angle of axes $\Sigma$, which was already described at the outset, or the effective intersection angle of axes $\Sigma_{eff}$, which is directly related thereto, a definition of these angles and further relevant variables is provided hereafter. In this case, a superscript i always identifies the variable for the $i^{th}$ cut, with $1 \leq i \leq k$, wherein for the final step $i=k$.

| | |
|---|---|
| Projection of intersection of axes | The view of the workpiece and the power skiving tool along the joint plumb of the axes of rotation R1 and R2 from the axis of rotation R2 in the direction of the gear teeth is referred to as the axis intersection projection. FIG. 2B shows an projection of intersection of axes, for example. |
| Intersection angle of axes | The intersection angle of axes $\Sigma^i$ is the smaller angle in absolute value which is enclosed by the two axes of rotation R1 and R2 in the $i^{th}$ cut. It is visible in the axis intersection projection. The relationship $-90° < \Sigma^i < 90°$, $\Sigma^i \neq 0°$ applies. The intersection angle of axes $\Sigma^i$ is signed. |
| Pitch point | The pitch point $WP^i$ corresponds to the contact point of the respective pitch circles with the diameters $d_{w2}{}^i$ and $d_{w1}{}^i$ of workpiece and tool, respectively. |
| Velocity vectors | $\vec{v}_1{}^i$ is the velocity vector on the power skiving tool and $\vec{v}_2{}^i$ is the velocity vector on the workpiece. These velocity vectors $\vec{v}_1{}^i$ and $\vec{v}_2{}^i$ are defined for each of the k cuts at the associated pitch point $WP^i$. |
| Effective intersection angle of axes | The effective intersection angle of axes $\Sigma_{eff}{}^i$ in the ith cut is the angle enclosed by the two velocity vectors $\vec{v}_2{}^i$ and $\vec{v}_1{}^i$ according to $$\cos(\Sigma_{eff}^i) = \frac{\vec{v}_2^i \cdot \vec{v}_1^i}{|\vec{v}_2^i||\vec{v}_1^i|}.$$ According to certain embodiments, the relationship $-90° < \Sigma_{eff}{}^i < 90°$, $\Sigma_{eff}{}^i \neq 0°$ applies. The effective intersecction angle of axes $\Sigma_{eff}{}^i$ is signed, like the intersection angle of axes $\Sigma^i$. The sign of the effective intersection angle of axes $\Sigma_{eff}{}^i$ is the same as the sign of the intersection angle of axes $\Sigma^i$. For non-inclined ($\delta^i = 0$) power skiving tools, the effective intersection angle of axes $\Sigma_{eff}{}^i$ is equal to the intersection angle of axes $\Sigma^i$. In general, the relationship $\cos \Sigma^i = \cos \Sigma_{eff}{}^i \cdot \cos \delta^i$ [01] applies with the inclination angle $\delta^i$. |
| Axial distance | The axial distance $a^i$ in the cut i and the pitch circle diameter are related via the following formula: $2a^i = (d_{w1}{}^i + d_{w2}{}^i \cdot \cos(\delta^i)) \cdot \sin(\Sigma_{eff}{}^i)/\sin(\Sigma^i)$ |

In conventional multiple cut machining, the machining depth for the individual cuts is produced by the radial infeed with respect to the workpiece 50. In this case, the spatial orientation, which is defined by the angles $\Sigma$, $\Sigma_{eff}$, and $\delta$, of the cutting teeth 111 of the tool 100 or of the tool inserts of the tool 100 in relation to the workpiece 50 does not change. That is to say, the angles $\Sigma^i$, $\Sigma_{eff}^i$, and $\delta^i$ are equal for all cuts in conventional skiving.

In multiple cut machining, as a result of the different radial infeed, the (sign-capable) axial distance a between workpiece axis R2 and tool axis R1 also changes. That is to say, the distances $a^i$ are different for each of the k individual cuts. When working with a non-inclined tool 100 ($\delta^i$=0), the radial infeed directly corresponds to the change of the axial distance a.

If the resulting cutting speed vector in the pitch point $WP^i$ of the ith cut and for the final cut (i=k) is to point in the direction of the gap 52 of the workpiece 50, the following general condition thus has to be fulfilled:

$$d_{w1}^i = d_{w2}^i \cdot u \cdot \cos(\beta_{w2}^i)/\cos(\Sigma_{eff}^i - \beta_{w1}^i)$$

u is the transmission ratio and $\beta_{w2}^i$ is the inclination angle of the workpiece 50 on the pitch circle diameter $d_{w2}^i$.

For the more easily comprehensible case of straight gear teeth ($\beta_{w2i} = \beta_2 = 0$), the relationship is $$d_{w1}^i = d_{w2}^i \cdot u \cdot \cos(\Sigma_{eff}^i)$$

and the formula for the axial distance from the above table simplifies to $$2a^i = d_{w1}^i \cdot (1 - \cos(\Sigma^i)/u) \cdot \sin(\Sigma_{eff}^i)/\sin(\Sigma^i) \quad [2].$$

From this definition of the axial distance $a_i$, it is apparent that in conventional multiple cut power skiving, with a change of the axial distance $a_i$, the respective active pitch circle diameter $d_{w1}^i$ of the tool 100 changes as a result of maintaining the spatial orientation of the cutting teeth 111 or of the tool insert.

Figure 6A:
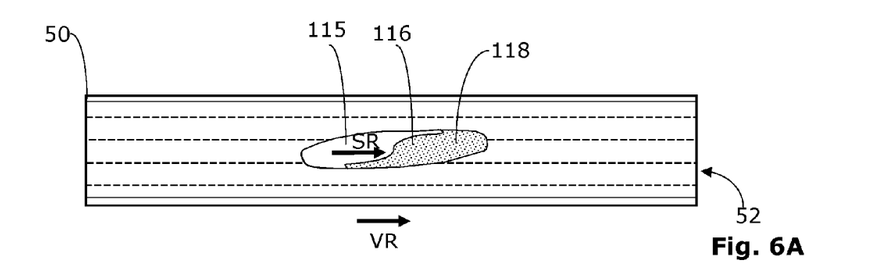
FIG. 6A shows a portion of a workpiece in a top view, wherein the position and shape of the trough correspond to a first step of a three-step power skiving method (FIGS. 6A-6C show typical situations for the machining of internal gear teeth)

During the machining of the internal gear teeth, the axial distance $a^1$ in the first cut is less than the axial distance $a^k$ in the final cut k, as is the active pitch circle diameter of the tool 100. This situation and the resulting different cutting conditions are illustrated in FIGS. 6A 6C. As an example, the final cut was designed here so that the pitch circle diameter $d_{w1}^3 = d_{w1}$ corresponds to the head circle diameter of the tool 100, whereby a typical continuous diagonally extending generating line 116 results, as shown in FIG. 6C. In the second cut (see FIG. 6B), the pitch circles touch at approximately half of the present machining depth of 66.6%, whereby a typical Z-shaped profile of the generating line 116 results. In the first cut (see FIG. 6A), a diagonal profile of the generating line 116 results, with reversed orientation as in FIG. 6C.

According to certain embodiments, the goal is to obtain similar profiles of the generating lines 116 during the individual cuts. To obtain similar profiles of the generating lines 116 during the non-final cuts (i<k) while using the same tool 100, according to certain embodiments, the pitch circle diameter $d_{w1}^i$ is kept approximately constant. From above formula [02], it is apparent that this can be achieved by adapting the spatial orientation of the cutting tooth 111 or of the tool insert of the tool 100, i.e., which can be achieved via the angles $\Sigma^i$, $\Sigma_{eff}^i$, and $\delta^i$ related via formula [01], which is contained in the above table.

In this case, the inclination angle $\delta^i$ is preferably kept constant, so that the angles $\Sigma^i$ and $\Sigma_{eff}^i$ result from formula [02]. However, this does not have to be the case. The inclination angle $\delta^i$ could also be changed in specific limits for a part or for all cuts.

Certain embodiments are thus based on the fact that, for example, a two-cut power skiving method works with two effective intersection angle of axes (called first effective intersection angle of axes $\Sigma_{eff}^1$ and second effective intersection angle of axes $\Sigma_{eff}^2$ here), which significantly differ. In a k-cut power skiving method, there are k different effective intersection angle of axes $\Sigma_{eff}^1$ to $\Sigma_{eff}^k$. (In various embodiments, k is an integer greater than or equal to 2).

The absolute value of the difference of the various effective intersection angle of axes $\Sigma_{eff}^i$ is dependent on the respective pitch circle location.

Reference is also made hereafter to a "skewed" location of the two axes of rotation R1 and R2, if the intersection angle of axes $\Sigma^i$ is not equal to zero. Since the intersection angle of axes $\Sigma^i$ is always not equal to zero according to certain embodiments, the two axes of rotation R1 and R2 are set skewed in certain embodiments.

Fundamental aspects of the method according to certain embodiments are described hereafter with reference to the very schematic depictions of FIGS. 3A to 3C and 7A to 7C. These figures are primarily used to derive the solutions according to certain embodiments and are to be understood as very schematic illustrations.)

$\beta_{w1} = \beta_{w1}^k$ is the inclination angle of the power skiving tool 100 on the pitch circle and $\beta_{w2} = \beta_{w1}^k$ is the inclination angle of the workpiece 50 on the pitch circle. The effective intersection angle of axes $\Sigma_{eff}$ fulfills the relationship $\Sigma_{eff} = \beta_{w2} + \beta_{w1}$. These values are typically ascertained in the scope of the computer design in consideration of optimum chip conditions for the final cut, during which the final flank surface is generated. The final cut is performed in a method having k steps in the $k^{th}$ step. That is to say, the effective intersection angle of axes $\Sigma_{eff}^k = \Sigma_{eff}$ is more or less ascertained in the computer design.

Previously, the same effective intersection angle of axes $\Sigma_{eff}^k$ was used in all k cuts of a k-cut power skiving method. In certain embodiments, a different effective intersection angle of axes is specified and set in each case in all or in a part of the k cuts. That is to say, before all cuts or before a part of the cuts, the power skiving tool 100 is pivoted in each case in relation to the workpiece 50 into another position, to thus obtain a comparable profile of the generating line 116.

Figure 3A:
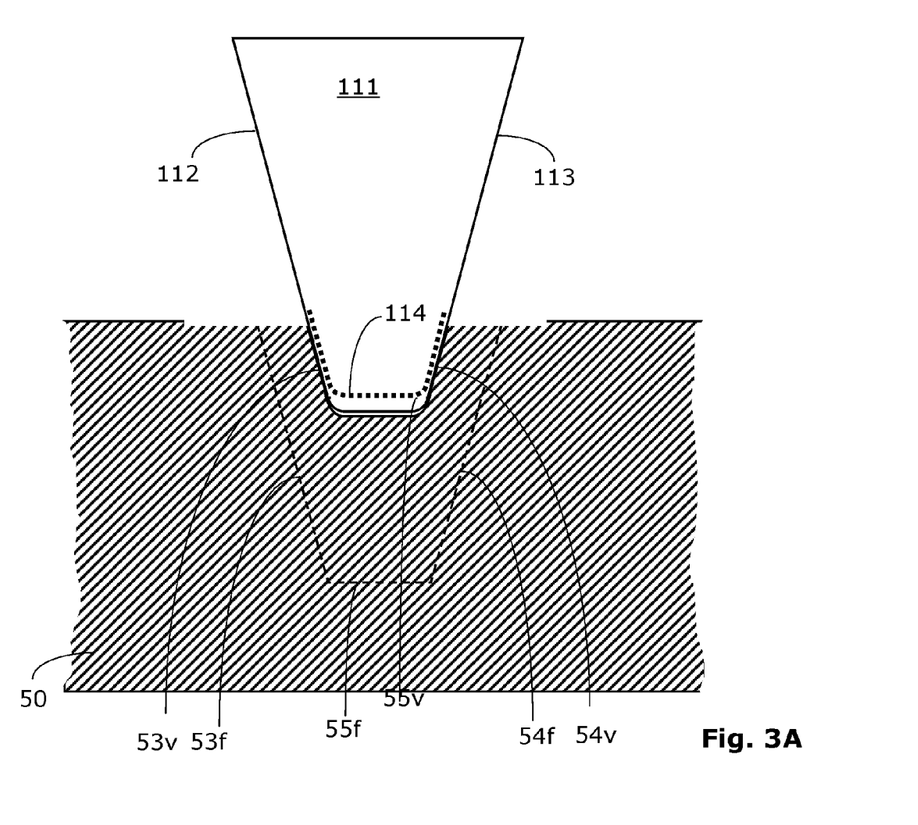
FIG. 3A shows a schematic and non-proportional sectional illustration of the first method step of a three-step method.
Figure 3B:
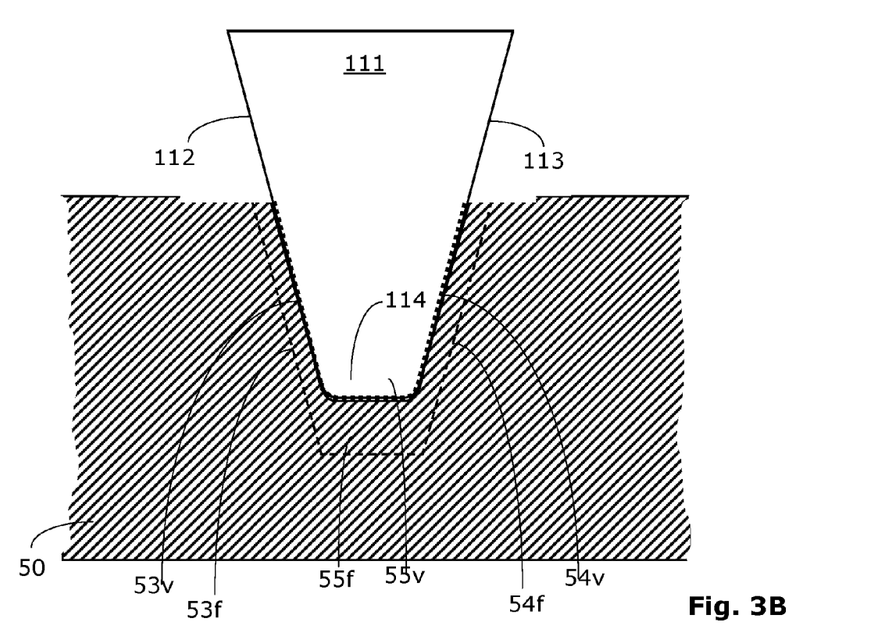
FIG. 3B shows a schematic and non-proportional sectional illustration of the second method step of the three-step method.
Figure 3C:
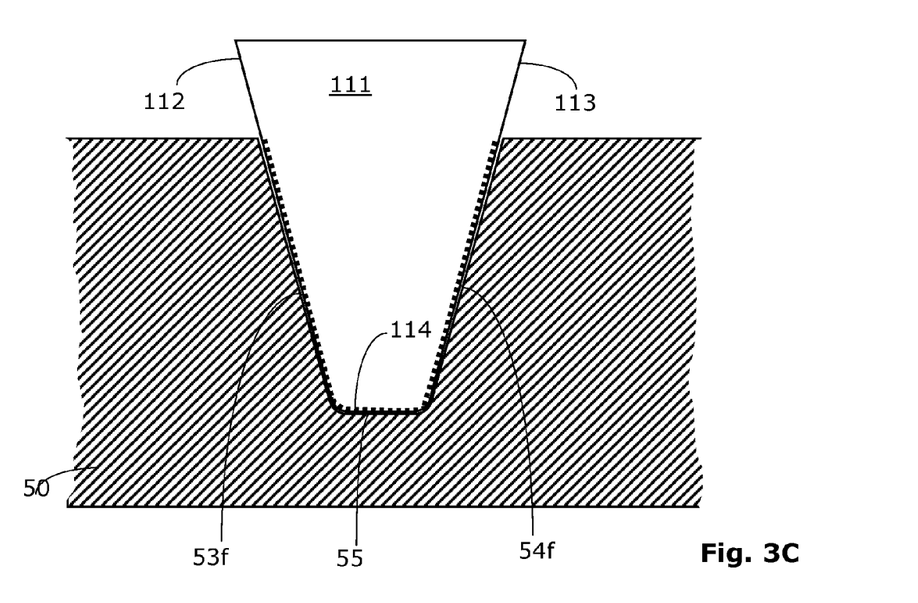
FIG. 3C shows a schematic and non-proportional sectional illustration of the third (final) method step of the three-step method.

The basic principle of the method according to certain embodiments for power skiving a workpiece 50 will now be shown and described on the basis of FIGS. 3A to 3C. The workpiece 50 has a rotationally-symmetrical, periodic structure, which is finish machined in the scope of the method according to certain embodiments, or on which such a structure is manufactured from the solid.

According to certain embodiments, a workpiece 50 and a power skiving tool 100 are provided. The power skiving tool 100 has multiple cutting teeth 111 and has an axis of rotation R1. Each of the cutting teeth 111 comprises a first flank cutting edge 113 for cutting the right flanks 54, a second flank cutting edge 112 for cutting the left flanks 53, and a head cutting edge 114, which is located in a transition region between the first flank cutting edge 113 and the second flank cutting edge 112 and machines the tooth base 55.

FIGS. 3A to 3C show the three cuts (k=3) of an exemplary method in a very simplified form, wherein only one cutting tooth 111 is shown in each case of the power skiving tool 100. In addition, only one tooth gap 52 is shown.

The following lines are additionally shown, to make the relative locations of the power skiving tool 100 and the workpiece 50 recognizable in FIGS. 3A to 3C. A thick, dotted line traverse shows, in schematic form, the portions (flanks) of the cutting tooth 111, which remove material on the workpiece 50 in the moment shown.

The first step of the method is shown in FIG. 3A. The cutting tooth 111 penetrates 33.33% into the material of the workpiece 50 here. Material is removed by the two flank cutting edges 112 and 113 on the tooth flanks 53v, 54v and material is moved by the complete head cutting edge 114 on the tooth base 55v, as shown by the mentioned dotted line traverse. The addition "v" in the reference signs 53v, 54v, and 55v expresses that these flanks and the base are pre-machined in this cut. The final location of the finished flanks and the tooth base is also indicated in FIG. 3A by a dashed line traverse and by the reference signs 53f, 54f, and 55f. FIG. 3A shows, in schematic form, a sectional view along section line C1-C1 in FIG. 7A.

The second step of the method is shown in FIG. 3B. The cutting tooth 111 penetrates 66.66% into the material of the workpiece 50 here. Material is removed by the two flank cutting edges 112 and 113 on the tooth flanks 53v, 54v and material is removed by the complete head cutting edge 114 on the tooth base 55v, as shown by the mentioned dotted line traverse. The addition "v" in the reference signs 53v, 54v, and 55v expresses that these flanks are pre-machined in this cut. FIG. 3B shows, in schematic form, a sectional view along section line C2-C2 in FIG. 7B.

In FIG. 3B, the final location of the finished flanks and the tooth base is also indicated by a dashed line traverse and by the reference signs 53f, 54f, and 55f.

FIG. 3C shows the final cut. In FIG. 3C, material is removed by the two flank cutting edges 112 and 113 on the tooth flanks 53f, 54f and material is removed by the complete head cutting edge 114 on the tooth base 55f, as shown by the mentioned dotted line traverse. The addition "f" in the reference signs 53f, 54f, and 55f expresses that these flanks are finish machined in the final cut. FIG. 3C shows, in schematic form, a sectional view along section line C3-C3 in FIGS. 6C and 7C.

It can be recognized on the basis of FIGS. 3A to 3C that it is a multiple cut completing method, since in each case the right and the left flanks of a gap 52 are machined simultaneously.

Figure 4A:
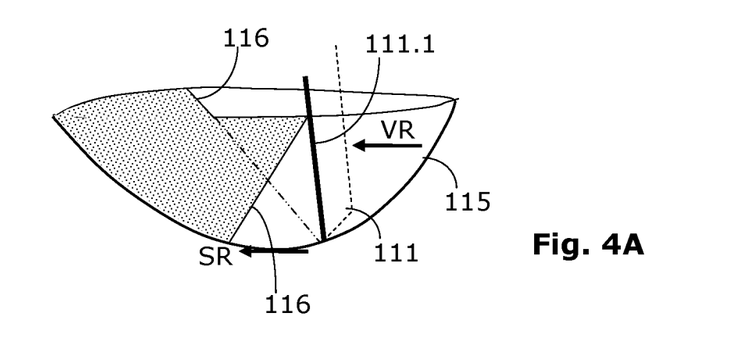
FIG. 4A shows a result of a simulation of the relative movement of a cutting tooth of a power skiving tool in the material of a workpiece during the counter-rotating power skiving in a first snapshot.
Figure 4B:
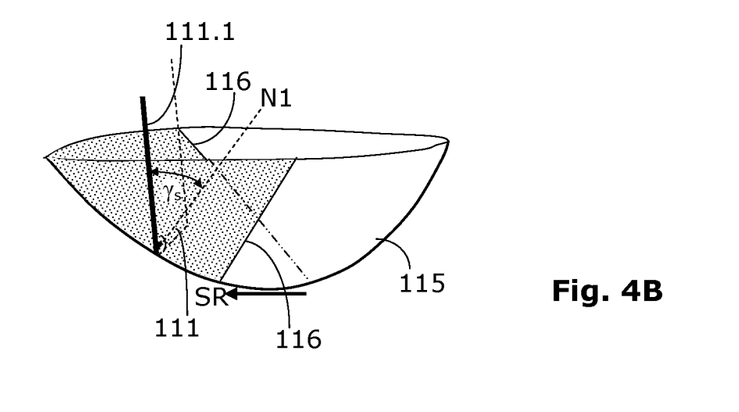
FIG. 4B shows a second snapshot of the simulation, wherein the cutting tooth of the power skiving tool has moved somewhat farther to the left in the cutting direction in the material of the workpiece in relation to the situation in FIG. 4A.
Figure 4C:
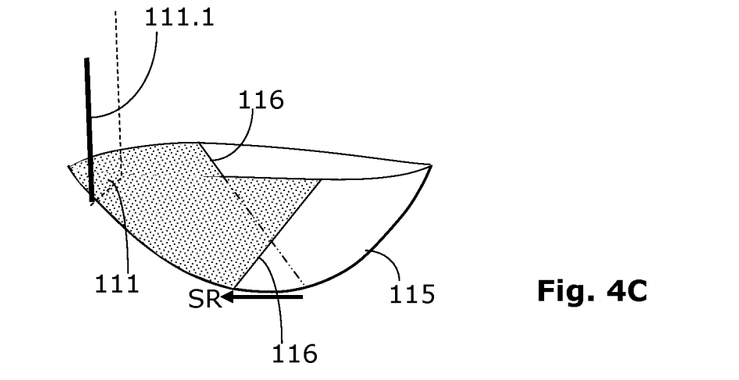
FIG. 4C shows a third snapshot of the simulation, wherein the cutting tooth of the power skiving tool has moved somewhat further to the left in the cutting direction in the material of the workpiece in relation to the situation in FIG. 4B.

The movement of a cutting tooth 111 of a power skiving tool 100 through the material of a workpiece 50 during power skiving is schematically shown in FIGS. 4A to 4C. FIGS. 4A to 4C show the effective rake angle profile on the cutting head, or on the cutting tooth 111 of a power skiving tool 100, respectively, over the cut profile during the final cut.

Because of the superposition of coupled rotational movements, i.e., which are synchronized with one another, of the power skiving tool 100 about the first axis of rotation R1 and of the workpiece 50 about the second axis of rotation R2, and of feed movements of the power skiving tool 100 in relation to the workpiece 50, when recording the entirety of the path points of a cutting edge, a type of trough shape results, as shown in FIGS. 4A to 4C and 5. The corresponding trough is identified in FIGS. 4 A to 4C and 5 with the reference sign 115.

The effective rake angle $\gamma_s$ on the cutting head, which is negative at the moment shown, is sketched in FIG. 4B. The effective rake angle $\gamma_s$ corresponds in the selected projected illustration approximately to the angle between the chips surface of the cutting edge 111.1 and the normal N1 in the contact point between chip surface and trough 115.

FIG. 4A shows the relative movement of the cutting tooth 111 of the power skiving tool 100 in the material of the workpiece 50 in a first snapshot. The orientation and location of the cutting edge 111.1 of the cutting tooth 111 is shown by a thick stroke. The trough 115 results from the entirety of the path points, which are located in the gap 52 of the workpiece 50, of the cutting edge 111.1 of the cutting tooth 111 for an engagement of the cutting tooth 111 in this gap 52. The following engagement of a further cutting tooth (this can be the same or another cutting tooth of the tool 100) also generates a trough 115, which is offset in the axial direction inside the gap 52 as a result of the axial feed and the differential feed coupled thereto. The trough 115 thus moves during the power skiving step-by-step (at least virtually) through the material of the workpiece 50. FIG. 4A shows a line 116, which divides the trough 115 into a left and a right portion. The concealed part of the line 116 is shown by a dot-dash line. The line 116 delimits the superposition of two troughs from one another, which differ in their position by the feed between two immediately successive cutting tooth engagements. That is to say, the line 116 identifies the intersection curve of the two troughs. For infinitely small axial feed, this intersection curve corresponds to the so-called generating line. The entire tooth gap 52 can be conceived as a set of such generating lines, which travel in the feed direction VR through the material of the workpiece 50. In the power skiving machining process having axial feed $s_{ax}$, material is only removed on the workpiece 50 by the moving cutting edge 111.1 in the region from the generating line 116 (i.e., left of the generating line 116 in the example shown). This region, where the material removal takes place, is shown gray in FIGS. 4A to 4C. In the white region of the trough 115, i.e., in front of the generating line 116 viewed in the cutting direction SR (i.e., right of the generating line 116 in the example shown), the material was already removed by the prior tool engagement.

FIG. 4B shows a second snapshot of the simulation, wherein the cutting tooth 111 of the power skiving tool 100 has moved somewhat further to the left in cutting direction SR in the material of the workpiece 50 in relation to the situation in FIG. 4A.

FIG. 4C shows a third snapshot of the simulation, wherein the cutting tooth 111 of the power skiving tool 100 has moved still further to the left in cutting direction SR in the material of the workpiece 50 in relation to the situation in FIG. 4B.

Figure 5:
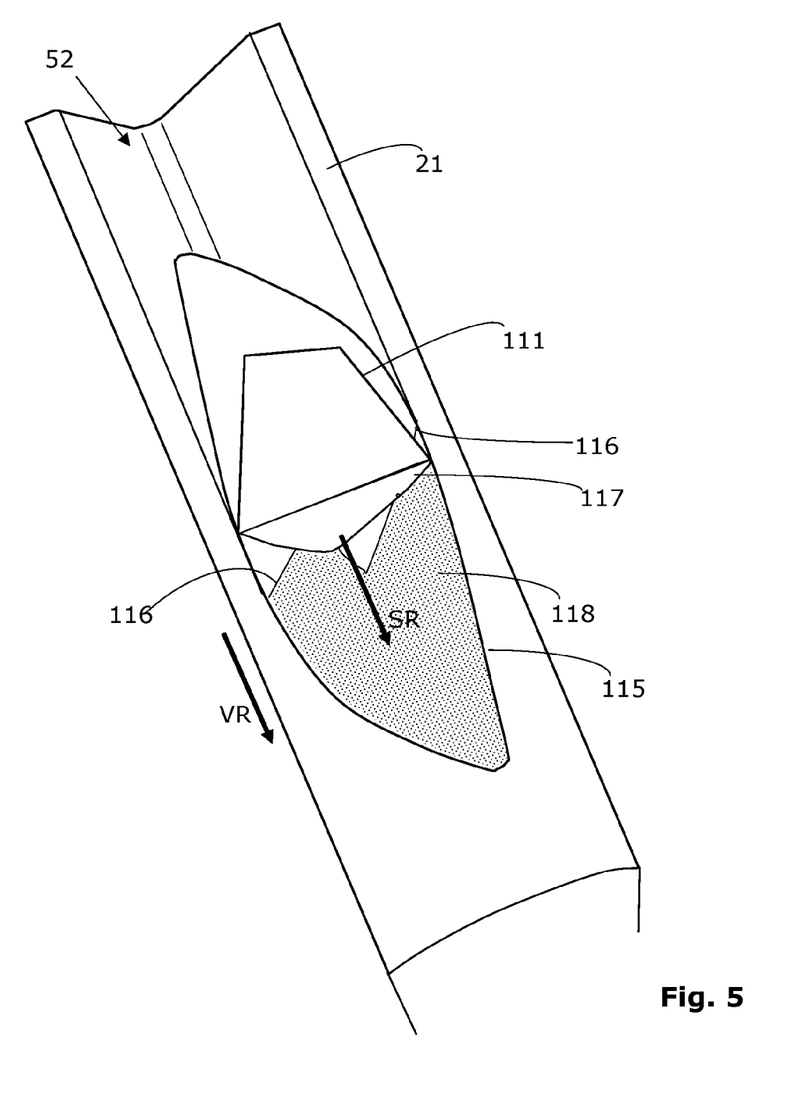
FIG. 5 shows a portion of a workpiece in a top view, wherein the position of the trough during the generation of a tooth gap is shown in very schematic form in counter-rotating power skiving.

FIG. 5 shows a portion of a workpiece 50 in a top view, wherein the position of the trough 115 during the passage of a tooth gap 52 is shown in very schematic form. It can be seen on the basis of FIG. 5 how the chip surface 117 of a cutting tooth 111 is instantaneously positioned in the trough 115 and removes material in the gray region 118 of the trough 115. The cutting direction SR and the feed direction VR in the calculation point AP are shown. Both directions SR and VR extend according to the design in the gap direction and therefore in parallel to one another, in particular in the same direction in parallel to one another in conventional power skiving. As a result of the complex relative movement of the power skiving tool 100 in relation to the workpiece 50, engagement conditions and effective cutting directions, which change, result.

Figure 6B:
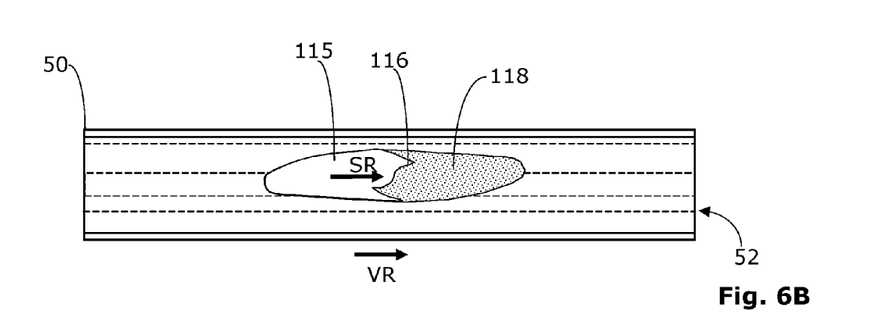
FIG. 6B shows a portion of the workpiece of FIG. 6A in a top view, wherein the position and shape of the trough correspond to the second step of the three-step power skiving method.
Figure 6C:
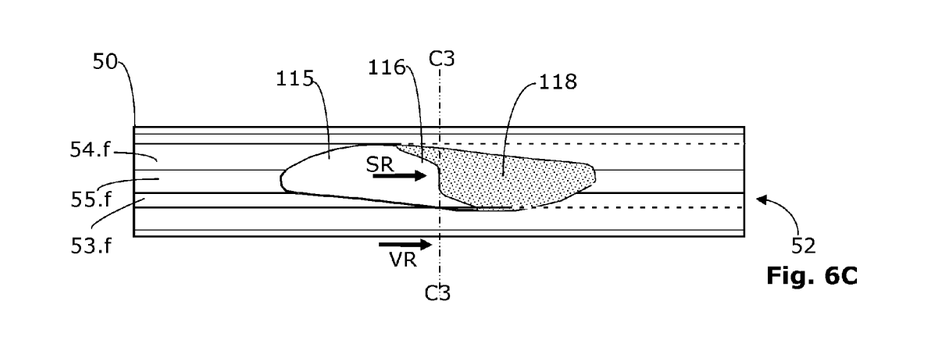
FIG. 6C shows a portion of the workpiece of FIG. 6A in a top view, wherein the position and shape of the trough correspond to the third (final) step of the three-step power skiving method.

FIGS. 6A to 6C show depictions which correspond to the situations in a conventional power skiving method having multiple cut strategy (with three cuts here) (FIGS. 6A 6C are examples of the case that the final cut was designed so that the pitch circles are located on the base circle of the workpiece 50 or the head circle of the tool 100). FIG. 6A shows, in schematic form, the trough 115 at 33.33% cutting depth, FIG. 6B shows the trough 115 at 66.66% cutting depth, and FIG. 6C shows the trough 115 during the final cut.

In FIG. 6C, the final flanks 53.f, 54.f and the tooth base 55.f on the already machined portion can be recognized. It is to be noted that FIGS. 6A to 6C each show solid cuts, although the cutting tooth 111 does not cut to completion in the 66.66% cut and in the final cut.

The material removal takes place in the gray region of the trough 115. The chip formation begins in the counter-rotating power skiving, which is shown as an example, approximately in the trough middle, i.e., in the region of the generating line 116 or in the region of the transition from the gray region 118 to the region illustrated as white, and ends directly at the front-most trough edge 84 (viewed in feed direction VR).

The change of the shape of the generating line 116 from an inclined profile in FIG. 6A via a Z-shaped profile in FIG. 6B to an inverted inclined profile in FIG. 6C can be clearly recognized on the basis of FIGS. 6A to 6C. These simulations have also shown that the ratio of the chip thicknesses between incoming and outgoing flank worsens more and more FIGS. 7A to 7C show depictions which correspond to the situations in FIGS. 3A to 3C, i.e., depictions are shown in FIG. 7A to 7C, which show the steps of an exemplary three-cut power skiving method.

Figure 7A:
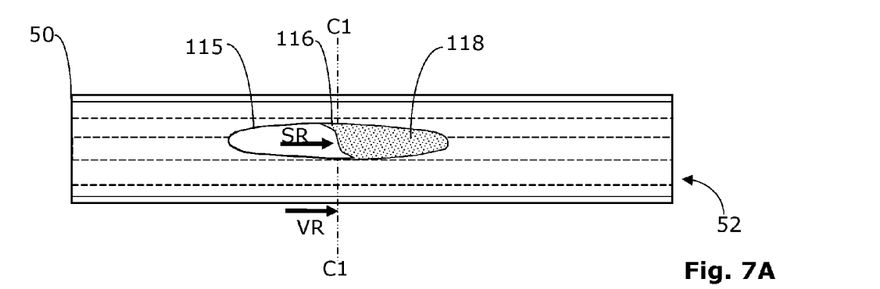
FIG. 7A shows a portion of a workpiece in a top view, wherein the position and shape of the trough correspond to the first step of the method, which is also shown in FIG. 3A (FIGS. 7A-7C show typical situations for the machining of internal gear teeth)
Figure 7B:
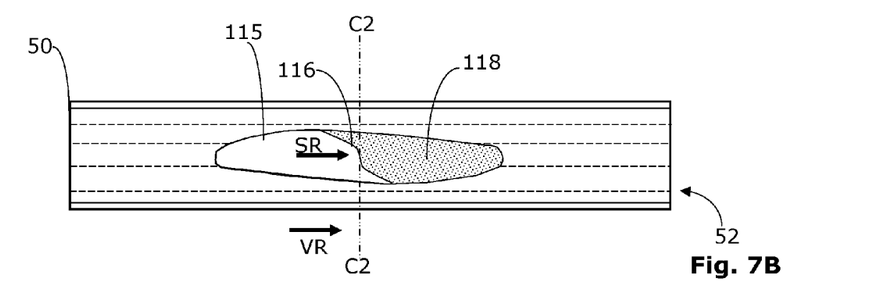
FIG. 7B shows a portion of a workpiece in a top view, wherein the position and shape of the trough correspond to the second step of the method, which is also shown in FIG. 3B.
Figure 7C:
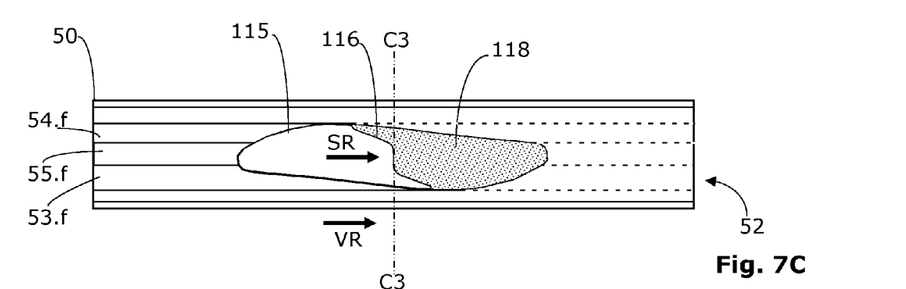
FIG. 7C shows a portion of a workpiece in a top view, wherein the position and shape of the trough correspond to the third (final) step of the method, which is also shown in FIG. 3C.

FIG. 7A shows, in schematic form, the trough 115 at 33.33% cutting depth, FIG. 7B shows the trough 115 at 66.66% cutting depth, and FIG. 7C shows the trough 115 during the final cut. Therefore, the final flanks 53.f, 54.f and the tooth base 55.f on the already machined portion can also be recognized in FIG. 7C. It is to be noted that FIG. 7C corresponds to FIG. 6C, since for better comparison, a conventional power skiving method was compared to a power skiving method according to the instant embodiment, wherein the design of identical workpieces 50 was presumed as an example for both methods, which are to be produced using identical final cuts.

According to certain embodiments, in each case different effective intersection angle of axes $\Sigma_{eff}^i$ were ascertained by a computer and set by a controller of a power skiving machine for the first, second, and third cuts. The respective effective intersection angle of axes $\Sigma_{eff}^1$ for the first cut, $\Sigma_{eff}^2$ for the second cut, and $\Sigma_{eff}^3$ for the third (final) cut were ascertained so that during the execution of the first power skiving machining, during the execution of the second power skiving machining, and during the execution of the third (final) power skiving machining, in each case generating lines 116 result, the shapes of which are identical or similar and therefore result in similar chip conditions.

It can be recognized on the basis of FIGS. 7A to 7C that by adapting the effective intersection angle of axes, it was possible to keep the shape of the generating line 116 identical or similar. Such a similarity of the shape of the generating line 116 in FIGS. 7A to 7C was intentionally selected, because the effect may be mediated more clearly in this manner. Finally, the present invention does not necessarily relate to achieving equivalence in the shape of the generating line 116, but rather it relates to improving the chip forming conditions for a part or ideally for all cuts.

If one wishes to achieve similarity in the shape of the generating line 116, thus, for example, the respective effective intersection angle of axes (and optionally also the inclination angle $\delta_i$) of the individual cuts can be specified so that the profile of the generating line 116, in all cuts, extends monotonously inclined in the same direction, wherein preferably the slope is to be equal or similar, or extends in a Z shape, wherein preferably in the Z-shaped profile, the offset of the two outer lines of the generating line 116 is to be equal or similar As has been shown, by adapting the effective intersection angle of axes, the engagement profile can be qualitatively equal in all three cuts, with regard to the chip flow, the locally occurring forces, and the direction reversals.

These simulations have shown that a very positive effect results due to the invention with respect to the chip thicknesses on the incoming and outgoing flanks.

It is also a secondary effect of the tool pivoting that the effective rake angle changes. The effective rake angle is improved in particular for the very thin chips on the incoming flank, which generally has a good effect on the power skiving method. Simulations have shown that the effective rake angle on the cutting head 111 for non-final cuts was in fact able to be improved in relation to conventional power skiving methods.

The positive effect of the invention is illustrated on the basis of specific numeric examples hereafter.

Instead of an unfavorable effective rake angle of −20.5° in the first cut of a conventional power skiving method (see FIG. 6A), the most unfavorable rake angle in the first cut of the power skiving method according to certain embodiments (see FIG. 7A) is −16.3°. Such negative effective rake angles primarily occur in the transition region of the tooth flanks 53.v and 54.v to the tooth base 55.v. The effective rake angle in the first cut, for example, was able to be improved from 1.1° to 4.4° on the incoming tooth flank 54.v.

Furthermore, it can be seen that the trough 115 becomes larger due to the enlargement of the intersection angle of axes, which has a positive effect on the head rake angle for the first cut.

The effective chip removal thicknesses at equal feed of the tool 100 in relation to the workpiece 50 are also decreased. Accordingly, a higher feed can be used with equal chip removal thickness.

The method according to certain embodiments comprises at least the following steps, wherein the steps do not necessarily have to be executed in the specified sequence: providing the workpiece 50, providing the power skiving tool 100, which has multiple cutting teeth 111, specifying a first effective intersection angle of axes $\Sigma_{eff1}$ of the power skiving tool 100 in relation to the workpiece 50, executing a first power skiving machining of the workpiece 50, wherein during the first power skiving machining, the power skiving tool 100 penetrates up to a first infeed depth (for example, 33.33% of the final depth) into the workpiece 50 and the flanks 53.v, 54.v of the periodic structure of the workpiece 50 are pre-machined (this step is shown as an example in FIG. 3A), specifying a second effective intersection angle of axes $\Sigma_{eff2}$ of the power skiving tool 100 in relation to the workpiece 50, executing a second power skiving machining of the workpiece 50, wherein during the second power skiving machining, the power skiving tool 100 penetrates up to a final infeed depth into the workpiece 50 and the flanks 53.f, 54.f, 55.f of the periodic structure of the workpiece 50 are further machined. This step is shown as an example in FIG. 3C. In the exemplary method, the first effective intersection angle of axes $\Sigma_{eff}^1$ and the second effective intersection angle of axes $\Sigma_{eff}^2$ differ, i.e. $\Sigma_{eff}^1 \neq \Sigma_{eff}^2$.

The plunging of the tool 100, or the cutting teeth 111 of the tool 50, into the material of the workpiece 50 is specified, for example, by the axial distance a of the axes R1 and R2.

The axial distance for a first cut and for a second (final) cut can therefore be assumed to be given according to one embodiment. According to certain embodiments, a first effective intersection angle of axes $\Sigma_{eff}^1$ and a second effective intersection angle of axes $\Sigma_{eff}^2$ can be ascertained by computer, for example. In the scope of this ascertainment, the first pitch circle diameter for the first power skiving machining (i.e., for the first cut) and the second pitch circle diameter for the second power skiving machining (i.e., for the second cut) are set equal. Because the axial distance $a^1$ for the first power skiving machining and the axial distance $a^2$ for the second power skiving machining are known, the first effective intersection angle of axes $\Sigma_{eff}^1$ and the second effective intersection angle of axes can can now be ascertained by computer.

The final cut does not always have to be designed as shown and described in the specific exemplary embodiment.

For the general case (spiral gear teeth), the relationship, which is given according to the formula in the above table, between axial distance, pitch circle diameter, and tool orientation is more complex, but qualitatively equivalent, i.e., it enables the procedure demonstrated for the special case on the basis of somewhat more complex calculation formulas.

According to certain embodiments, during the first power skiving machining, the power skiving tool 100 is rotated by CNC-controlled drives (not shown) in a first rotational direction at the angular velocity $\omega_1$ about the axis of rotation R1 and the workpiece 50 is rotated in a second rotational direction at the angular velocity $\omega_2$ about the workpiece axis of rotation R2. During the first power skiving machining, a different effective intersection angle of axes is specified by the CNC-controlled drives than during the final power skiving machining. A directional reversal does not take place.

The described power skiving method can be used in a dry or wet form in various embodiments, wherein the use of the power skiving in a dry form is preferred.

The usage spectrum of the described power skiving method is large and extends to the application in the production of greatly varying rotationally-symmetrical periodic structures.

As may be recognized by those of ordinary skill in the pertinent art based on the teachings herein, numerous changes and modifications may be made to the above-described and other embodiments of the present invention without departing from the spirit of the invention as defined in the claims. Accordingly, this detailed description of embodiments is to be taken in an illustrative, as opposed to a limiting sense.

What is claimed is:

1. A method comprising:
    power skiving a workpiece having a workpiece axis of rotation and a rotationally-symmetrical, periodic structure using a power skiving tool comprising multiple cutting teeth or cutting inserts,
    wherein the method comprises a multiple cut completing method including at least a first power skiving machining of the workpiece and a second power skiving machining of the workpiece, the method further comprising:
        setting a first effective intersection angle of axes ($\Sigma_{eff}^1$) of the power skiving tool in relation to the workpiece,
        executing the first power skiving machining of the workpiece using the first effective intersection angle of axes ($\Sigma_{eff}^1$), wherein during the first power skiving machining, the power skiving tool penetrates up to a first infeed depth into the workpiece and all flanks of a periodic structure of the workpiece are premachined simultaneously,
        setting a second effective intersection angle of axes ($\Sigma_{eff}^2$) of the power skiving tool in relation to the workpiece without reversing a direction of rotation of one or more of the workpiece or the power skiving tool, and
        executing the second power skiving machining of the workpiece using the second effective intersection angle of axes ($\Sigma_{eff}^2$), wherein during the second power skiving machining, the power skiving tool penetrates up to a second or final infeed depth into the workpiece that is different from the first infeed depth and said flanks of the periodic structure of the workpiece are further machined simultaneously, wherein the first effective intersection angle of axes ($\Sigma_{eff}^1$) differs from the second effective intersection angle of axes ($\Sigma_{eff}^1$).

2. The method according to claim 1, further comprising ascertaining the first effective intersection angle of axes ($\Sigma_{eff}^1$) and the second effective intersection angle of axes ($\Sigma_{eff}^2$) so that the first power skiving machining and the second power skiving machining each define generating lines having substantially the same shape.

3. The method according to claim 1, further comprising ascertaining the first effective intersection angle of axes ($\Sigma_{eff}^1$) and the second effective intersection angle of axes ($\Sigma_{eff}^2$) so that the first power skiving machining and the second power skiving machining each define substantially identical cutting conditions.

4. The method according to claim 1, further comprising providing a different axial distance between the power skiving tool and (i) the workpiece or (ii) a machining depth in relation to a tooth height during the first power skiving machining and the second power skiving machining.

5. The method according to claim 2, further comprising providing a different axial distance between the power skiving tool and (i) the workpiece or (ii) a machining depth in relation to a tooth height during the first power skiving machining and the second power skiving machining.

6. The method according to claim 3, further comprising providing a different axial distance between the power skiving tool and (i) the workpiece or (ii) a machining depth in relation to a tooth height during the first power skiving machining and the second power skiving machining.

7. The method according to claim 4, further comprising:
    computing the first effective intersection angle of axes ($\Sigma_{eff}^1$) and the second effective intersection angle of axes ($\Sigma_{eff}^2$) based on (i) setting a first pitch circle diameter for the first power skiving machining and a second pitch circle diameter for the second power skiving machining equal to each other, and (ii) the axial distance of the first power skiving machining and the axial distance of the second power skiving machining.

8. The method according to claim 5, further comprising:
    computing the first effective intersection angle of axes ($\Sigma_{eff}^1$) and the second effective intersection angle of axes ($\Sigma_{eff}^2$) based on (i) setting a first pitch circle diameter for the first power skiving machining and a second pitch circle diameter for the second power skiving machining equal to each other, and (ii) the axial distance of the first power skiving machining and the axial distance of the second power skiving machining.

9. The method according to claim 6, further comprising:
    computing the first effective intersection angle of axes ($\Sigma_{eff}^1$) and the second effective intersection angle of axes ($\Sigma_{eff}^2$) based on (i) setting a first pitch circle diameter for the first power skiving machining and a second pitch circle diameter for the second power skiving machining equal to each other, and (ii) the axial distance of the first power skiving machining and the axial distance of the second power skiving machining.

10. The method according to claim 4, further comprising: setting by computer a pitch circle location on the power skiving tool of the first power skiving machining and a pitch circle location on the power skiving tool of the second power skiving machining to be equal.

11. The method according to claim 5, further comprising: setting by a computer a pitch circle location on the power skiving tool of the first power skiving machining and a pitch circle location on the power skiving tool of the second power skiving machining to be equal.

12. The method according to claim 6, further comprising: setting by a computer a pitch circle location on the power skiving tool of the first power skiving machining and a pitch circle location on the power skiving tool of the second power skiving machining to be equal.

13. The method according to claim 4, further comprising ascertaining by computer the first effective intersection angle of axes ($\Sigma_{eff}^1$) and the second effective intersection angle of axes ($\Sigma_{eff}^2$) so that an engagement profile during the first power skiving machining is substantially identical to an engagement profile during the second power skiving machining.

14. The method according to claim 5, further comprising ascertaining by computer the first effective intersection angle of axes ($\Sigma_{eff}^1$) and the second effective intersection angle of axes ($\Sigma_{eff}^2$) so that an engagement profile during the first power skiving machining is substantially identical to an engagement profile during the second power skiving machining.

15. The method according to claim 6, further comprising ascertaining by computer the first effective intersection angle of axes ($\Sigma_{eff}^1$) and the second effective intersection angle of axes ($\Sigma_{eff}^2$) so that an engagement profile during the first power skiving machining is substantially identical to an engagement profile during the second power skiving machining.

16. The method according to claim 1, wherein each of the multiple cutting teeth or cutting inserts defines a first flank cutting edge and a second flank cutting edge opposite the first flank cutting edge, and during the step of executing the second power skiving machining, both the first flank cutting edge and a second flank cutting edge machine the workpiece.

17. A method comprising:
power skiving a workpiece having a workpiece axis of rotation and a rotationally-symmetrical, periodic structure using a power skiving tool comprising multiple cutting teeth or cutting inserts, the method further comprising:
setting a first effective intersection angle of axes ($\Sigma_{eff}^1$) of the power skiving tool in relation to the workpiece,
executing a first power skiving machining of the workpiece using the first effective intersection angle of axes ($\Sigma_{eff}^1$), wherein during the first power skiving machining, the power skiving tool penetrates up to a first infeed depth into the workpiece and the flanks of a periodic structure of the workpiece are premachined,
setting a second effective intersection angle of axes ($\Sigma_{eff}^2$) of the power skiving tool in relation to the workpiece, and
executing a second power skiving machining of the workpiece using the second effective intersection angle of axes ($\Sigma_{eff}^2$), wherein during the second power skiving machining, the power skiving tool penetrates up to a final infeed depth into the workpiece and the flanks of the periodic structure of the workpiece are further machined, wherein the first effective intersection angle of axes ($\Sigma_{eff}^1$) differs from the second effective intersection angle of axes ($\Sigma_{eff}^2$),
wherein the method further comprises
providing a different axial distance between the power skiving tool and (i) the workpiece or (ii) a machining depth in relation to a tooth height during the first power skiving machining and the second power skiving machining, and
computing the first effective intersection angle of axes ($\Sigma_{eff}^1$) and the second effective intersection angle of axes ($\Sigma_{eff}^2$) based on (i) setting a first pitch circle diameter for the first power skiving machining and a second pitch circle diameter for the second power skiving machining equal to each other, and (ii) the axial distance of the first power skiving machining and the axial distance of the second power skiving machining.

18. The method according to claim 17, further comprising ascertaining the first effective intersection angle of axes ($\Sigma_{eff}^1$) and the second effective intersection angle of axes ($\Sigma_{eff}^2$) so that the first power skiving machining and the second power skiving machining each define generating lines having substantially the same shape.

19. The method according to claim 17, further comprising ascertaining the first effective intersection angle of axes ($\Sigma_{eff}^1$) and the second effective intersection angle of axes ($\Sigma_{eff}^2$) so that the first power skiving machining and the second power skiving machining each define substantially identical cutting conditions.

20. The method according to claim 17, further comprising:
setting by computer a pitch circle location on the power skiving tool of the first power skiving machining and a pitch circle location on the power skiving tool of the second power skiving machining to be equal.

21. The method according to claim 17, further comprising ascertaining by computer the first effective intersection angle of axes ($\Sigma_{eff}^1$) and the second effective intersection angle of axes ($\Sigma_{eff}^2$) so that an engagement profile during the first power skiving machining is substantially identical to an engagement profile during the second power skiving machining.

22. The method of claim 17, wherein the step of setting a second effective intersection angle of axes ($\Sigma_{eff}^2$) of the power skiving tool in relation to the workpiece is performed without reversing a direction of rotation of one or more of the workpiece or the power skiving tool.

23. A method comprising:
power skiving a workpiece having a workpiece axis of rotation and a rotationally-symmetrical, periodic structure using a power skiving tool comprising multiple cutting teeth or cutting inserts, the method further comprising:
setting a first effective intersection angle of axes ($\Sigma_{eff}^1$) of the power skiving tool in relation to the workpiece, executing a first power skiving machining of the workpiece using the first effective intersection angle of axes ($\Sigma_{eff}^1$), wherein during the first power skiving machining, the power skiving tool penetrates up to a first infeed depth into the workpiece and the flanks of a periodic structure of the workpiece are premachined, setting a second effective intersection angle of axes ($\Sigma_{eff}^2$) of the power skiving tool in relation to the workpiece, and executing a second power skiving machining of the workpiece using the second effective intersection angle of axes ($\Sigma_{eff}^2$), wherein during the second power skiving machining, the power skiving tool penetrates up to a final infeed depth into the workpiece and the flanks of the periodic structure of the workpiece are further machined, wherein the first effective intersection angle of axes ($\Sigma_{eff}^1$) differs from the second effective intersection angle of axes ($\Sigma_{eff}^2$), wherein the method further comprises providing a different axial distance between the power skiving tool and (i) the workpiece or (ii) a machining depth in relation to a tooth height during the first power skiving machining and the second power skiving machining, and ascertaining by computer the first effective intersection angle of axes ($\Sigma_{eff}^1$) and the second effective intersection angle of axes ($\Sigma_{eff}^2$) so that an engagement profile during the first power skiving machining is substantially identical to an engagement profile during the second power skiving machining.

24. The method according to claim 23, further comprising ascertaining the first effective intersection angle of axes ($\Sigma_{eff}^1$) and the second effective intersection angle of axes ($\Sigma_{eff}^2$) so that the first power skiving machining and the second power skiving machining each define generating lines having substantially the same shape.

25. The method according to claim 23, further comprising ascertaining the first effective intersection angle of axes ($\Sigma_{eff}^1$) and the second effective intersection angle of axes ($\Sigma_{eff}^2$) so that the first power skiving machining and the second power skiving machining each define substantially identical cutting conditions.

26. The method according to claim 23, further comprising setting by computer a pitch circle location on the power skiving tool of the first power skiving machining and a pitch circle location on the power skiving tool of the second power skiving machining to be equal.

27. The method of claim 23, wherein the step of setting a second effective intersection angle of axes ($\Sigma_{eff}^2$) of the power skiving tool in relation to the workpiece is performed without reversing a direction of rotation of one or more of the workpiece or the power skiving tool.

* * * * *